United States Patent [19]

Guttinger et al.

[11] Patent Number: 5,018,334

[45] Date of Patent: May 28, 1991

[54] CARTON LOADING MACHINE HAVING LOAD ACCUMULATOR

[75] Inventors: Peter Guttinger, Rexdale; H. J. Paul Langen; Ronald J. Langen, both of Brampton, all of Canada

[73] Assignee: H. J. Langen & Sons Limited, Mississauga, Canada

[21] Appl. No.: 507,502

[22] Filed: Apr. 11, 1990

[51] Int. Cl.$^5$ ............... B65B 35/30; B65B 35/44
[52] U.S. Cl. ............................ 53/152; 53/540; 53/542; 198/429
[58] Field of Search ............ 53/152, 153, 540, 542; 198/429, 464.2, 794; 414/789.8, 794.7

[56] References Cited

U.S. PATENT DOCUMENTS

| | | | |
|---|---|---|---|
| 2,047,272 | 7/1936 | Kimball et al. | 53/537 X |
| 2,814,922 | 12/1957 | Pechy | 53/153 |
| 3,954,165 | 5/1976 | Snyder | 53/152 X |
| 4,142,626 | 3/1979 | Bradley | 198/794 X |
| 4,168,776 | 9/1979 | Hoeboer | 198/797 |
| 4,325,475 | 4/1982 | Spalding | 198/429 |
| 4,513,858 | 4/1985 | Fellner et al. | |
| 4,523,671 | 6/1985 | Campbell | 198/429 |
| 4,768,642 | 9/1988 | Hunter | 198/429 X |
| 4,835,947 | 6/1989 | Langer et al. | 53/542 |

Primary Examiner—Robert L. Spruill
Assistant Examiner—Daniel B. Moon
Attorney, Agent, or Firm—Fetherstonhaugh & Co.

[57] ABSTRACT

In a carton loading machine which receives load items from an infeed conveyor and which has a carton loading station in which a plurality of load items are loaded simultaneously into a carton, improvement of a load accumulator. The load accumulator is located between the infeed conveyor and the carton loading station of the carton loading machine and is arranged to admit load items into each of the single load transporting compartments in turn as each of the successive compartments are located in the input station. The discharge station located with a group of at least two load transporting compartments opening into the carton loading station of the carton loading machine. A transfer mechanism is mounted for movement between the discharge station and the carton loading station and is operable to transfer load items from the group of load transporting compartments located in the discharge station into the carton loading station to load a carton located therein in use.

1 Claim, 2 Drawing Sheets

CARTON LOADING MACHINE HAVING LOAD ACCUMULATOR

This invention relates to carton loading machines. In particular, this invention leads to a carton loading machine having a load accumulator.

U.S. Pat. No. 4,168,776 dated Sept. 25, 1979 and No. 4,513,858 dated Apr. 30, 1985 which issued to Mapatent NV each discloses a load accumulator which is used for the purposes of accommodating a shut down either upstream or downsteam thereof in a continuous manufacturing operation. In the device of U.S. Pat. No. 4,168,766 load items are loaded one at a time into the load transporting gondolas in a loading station and are unloaded one at a time from the gondolas in a discharge station. Separate drive mechanisms are provided for driving the through the loading station and through the discharge station. Because two independent drive mechanisms are provided, it is possible to interrupt the movement of the conveyor through the loading station while permitting continuous movement of the conveyor through the discharge station and vice versa.

Carton loading machines in which a plurality of items are assembled together to form a load before they are loaded into a carton are well known. One such apparatus is described in U.S. Pat. No. 4,835,947, H. J. Lanqen & Sons Limited, dated June 6, 1989. In this device a plurality of load items are accumulated in a loading station and then displaced laterally into receptacles from which they are subsequently discharged into a carton.

This type of load accumulator does not, however, make any allowance for interruption in the manufacturing processes which take place upstream of the carton loading machine nor does it make allowance for any interruption in the operation of the carton opening mechanism which takes place downstream of the carton loading station.

As indicated in above, it is known to provide mechanisms for arranging a group of items together for the purposes of establishing a load which is to be transferred into a carton and it is known to provide a mechanism which will make allowances for interruptions in an otherwise continuous production line by providing a load accumulator in which the movement of the load can bear through the loading station and through the discharge station is separately and independently controlled so that it is possible to interrupt the movement of the conveyor through the discharge station.

I have found that it is possible to take advantage of the fact that the movement of the conveyor through the load accumulator may be interrupted in order to locate the discharge station of the load accumulator and the carton loading station of a carton loading machine juxtaposed opposed one another and to provide a transfer mechanism which will transfer the load items from two or more adjacent unload transporting compartments directly into the loading station or a carton loading machine.

SUMMARY OF INVENTION

According to one aspect of the present invention, there is provided in a carton loading machine which receives load items from an infeed conveyor that conveys the items one at a time in at least one row of items and which has a carton loading station in which a plurality of load items are loaded simultaneously into a carton, improvement of; a load accumulator comprising; a load transfer conveyor having load transporting compartments at spaced intervals along the length thereof, an input station in which a single load transporting compartment is located, a discharge station in which a group of at least two longitudinally spaced load transporting compartments are located, a forward run extending from the input station to the discharge station and a return run extending from the discharge station to the input station, means for varying the load storage capacity of the forward run by arresting the movement of the forward run through the load transfer station, said load accumulator being located between the infeed conveyor and said carton loading station with said input station arranged to admit load items into each of said single load transporting compartments in turn as successive compartments are located in said input station, and with said discharge station located with one said group of load transporting compartments opening into in said carton loading station, and transfer means mounted for movement between the discharge station and carton loading station and operable to transfer load items from the group of load transporting compartments located in said discharge station into said loading station to load a carton located therein in use.

BRIEF DESCRIPTION OF THE DRAWINGS

The invention will be more clearly understood after reference to the following detailed specification read in conjunction with the drawings wherein:

With reference to FIG. 1 of the drawings, the reference numeral 10 refers generally to a load accumulator. The load accumulator is constructed substantially in accordance with U.S Pat. No 4,168,776 and will not therefore be described in detail. The load accumulator 10 has a load transfer conveyor 12 which has a plurality of divider panels 14 projecting outwardly therefrom which divide the length of the conveyor 12 into a plurality of longitudinally spaced load transporting compartments 16. The load accumulator has an input station 18 at one end thereof and a discharge station 20 at the other end thereof. A drive motor 22 is provided at the input station 18 and is drivingly connected to the wheel 24 which serves to drive the conveyor 12 through the input station 18. A drive motor 26 is provided at the discharge station 20 and serves to drive at the wheel 28 which serves to drive the conveyor 12 through the discharge station 20. The motors 22 and 26 are independently operable as described in U.S. Pat. No. 4,168,776 so that the movement of the conveyor through the discharge station may be interrupted while the movement of the conveyor through the input station may continue and vice versa. The conveyor 12 has a forward run 30 which extends from the input station 18 to the discharge station 20 and a return run 32 which extends from the discharge station 20 to the input station 18. The interruption in the movement of the conveyor through the discharge station caused by interrupting the operation of the driven wheel 28 while the driven wheel 24 continues to operate is accommodated by displacing the take up assemblies 34 in the manner described in U.S. Pat. No. 4,168,776.

Figure 1:
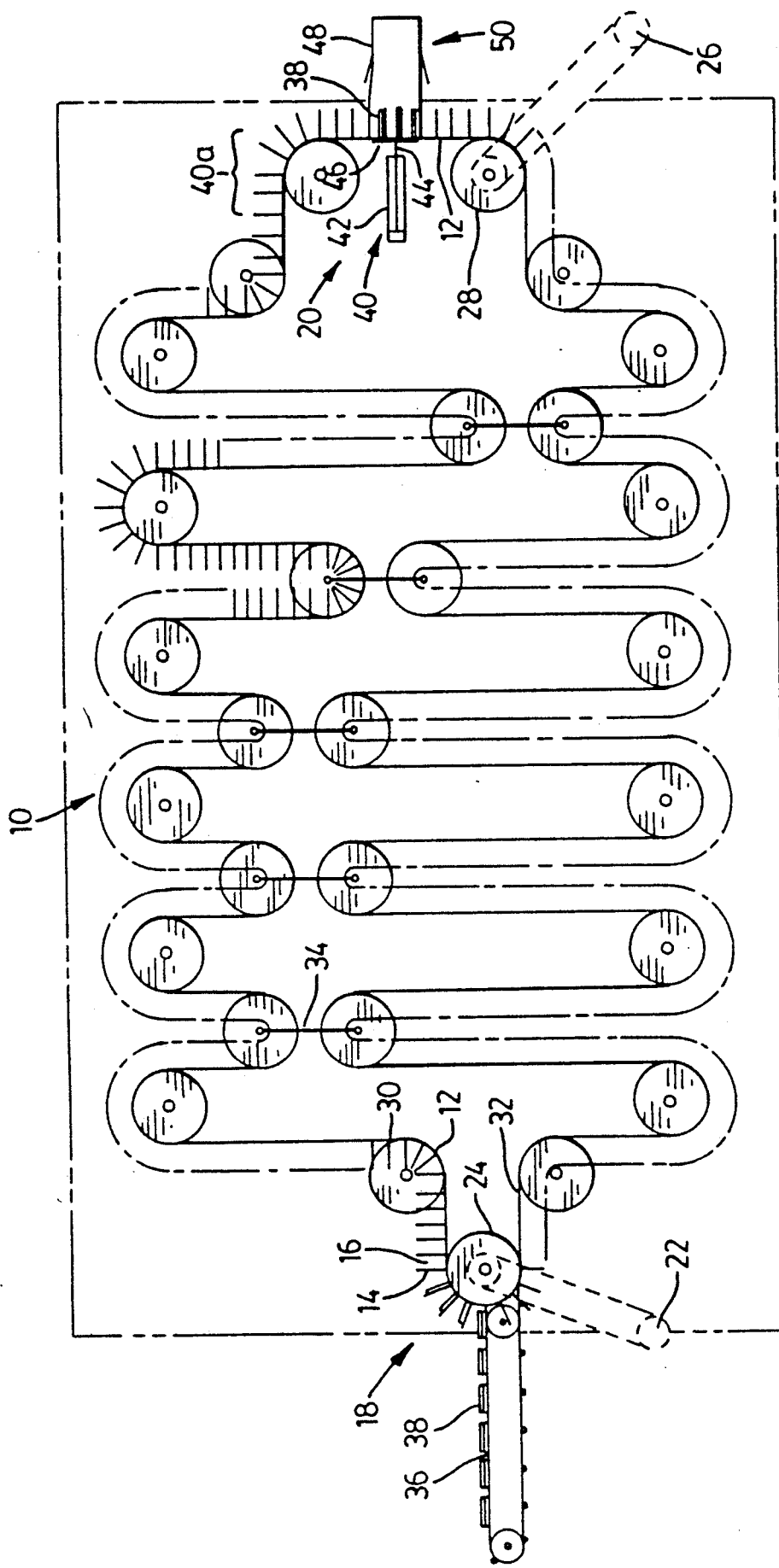
FIG. 1 is a diagrammatic side view of a load accumulator and carton loading machine constructed in accordance with an embodiment of the present invention.

An infeed conveyor 36 serves to feed load items 38 into the input station 18 wherein the load items are picked up by successive divider panels 14 if they are driven through the input station 18. The load items 38 are then transported through the load accumulator to the discharge station 20.

A transfer mechanism 40 is located in the discharge station when a transfer mechanism is in a form of a pneumatic cylinder 42 which has an extensible ram 44. A pusher blade 46 is mounted on the ram 44 and is arrange such that when the ram 44 is extended, the blade will engage a plurality of load items and will move them laterally into a carton 48 located in the carton loading station of a carton loading machine.

Figure 2:
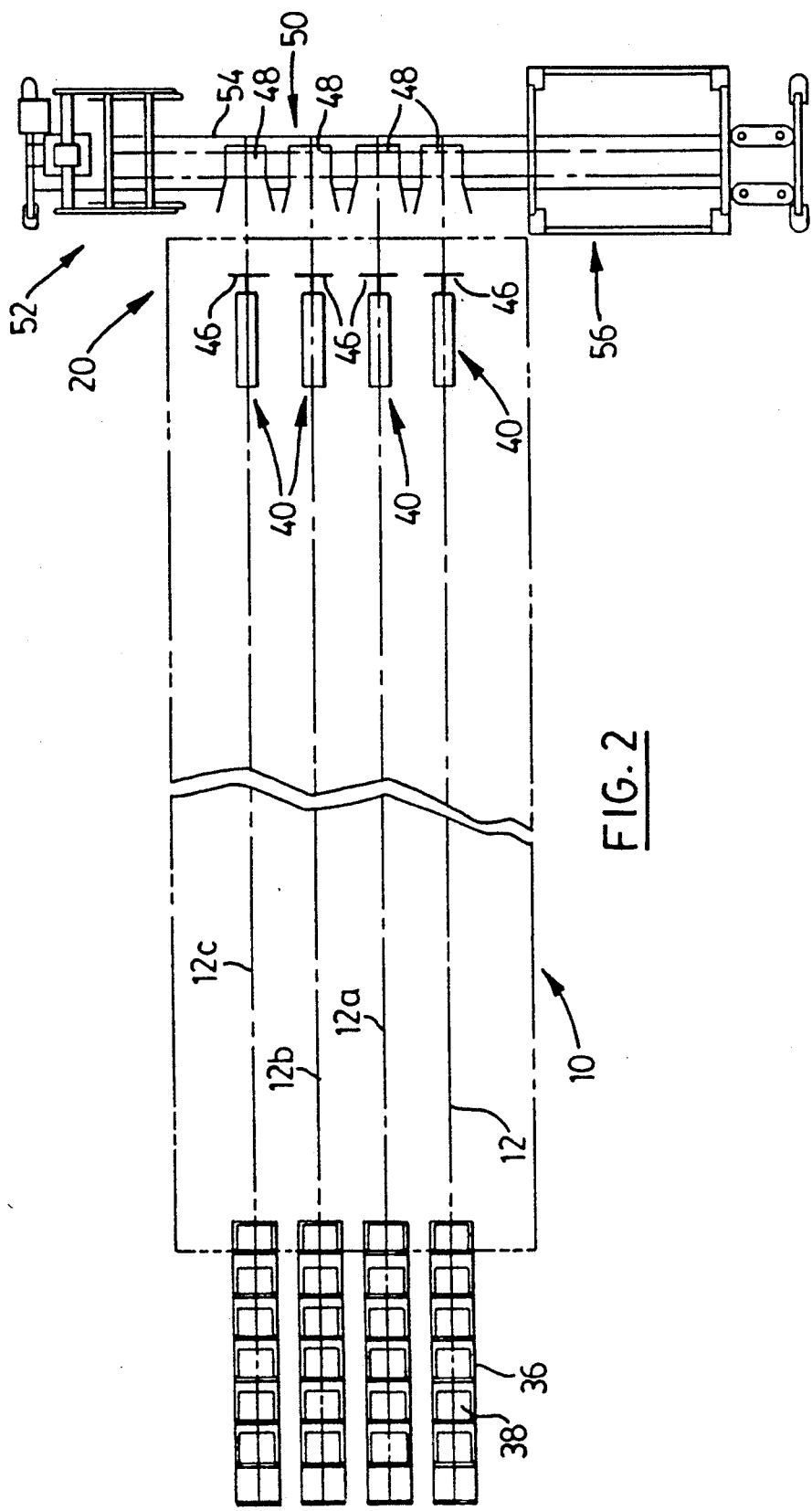
FIG. 2 is a plan view of the carton loading machine in FIG. 1.

As shown in FIG. 2 of the drawings of the carton loading machine, a carton opening mechanism 52 which opens cartons and deposits them on a carton conveyor 54 from which the open cartons are transferred into the carton loading station. The loaded cartons may then be closed in the carton closing station 56 and then discharged from the carton loading machine in a conventional manner. A carton opening mechanism and mechanism for transporting the open cartons through the carton loading machine is described in U.S. Pat. No. 4,537,587 dated Aug. 27, 1985, and issued to H. J. Langen & Sons Limited.

As shown in FIG. 2, four cartons can be loaded simultaneously by providing four load accumulating conveyors 12, 12a, 12b, and 12c arranged side by side and each driven by the drive motors 22 and 26 for simultaneous synchronized movement.

By locating the discharge station 20 of the load accumulator 10 juxtaposed the loading station 20 of the carton loading machine, it is possible to effect the transfer of load items from two or more adjacent load storage compartments into the open carton 48 by interrupting the movement of the load transfer conveyor through the discharge station while permitting continuous movement of the load transfer conveyor through the entry station.

Various modifications of the present invention are a fact of those skilled in the art. It will be apparent, for example, that the load items 38 can be discharged from more than three adjacent load transporting compartments 16. It will also be apparent that the discharge station 20 could be relocated so as to locate it in the area 40a.

These and other modifications of the present invention are apparent to those skilled in the art.

I claim:

1. A carton loading machine which receives load items from an infeed conveyor that conveys the items one at a time in at least one row of items, said carton loading machine comprising;
    (a) a carton loading station in which a plurality of load items are loaded simultaneously into a carton,
    (b) a variable capacity load accumulator comprising;
        i) a load transfer conveyor having load transporting compartments at spaced internals along the length thereof,
        ii) an input station in which a single load transporting compartment is located,
        iii) a discharge station in which a group of at least two longitudinally spaced load transporting compartments are located,
        iv) a forward run which has a substantial length extending from the input station to the discharge station and a return run extending from the discharge station to the input station,
        v) first and second conveyor drive means located proximate the input station and the discharge station respectively and operable to independently drive or arrest the movement of the forward run through the load transfer station and through the input station to vary the load storage capacity of the forward run to provide a range of load storage capacity which is substantially greater than the load capacity of the carton loading station to accommodate substantial interruption in the supply of load items to the input station or the transfer of load items in the carton loading station,
    (c) said variable capacity load accumulator being located between the infeed conveyor and said carton loading station with said input station arranged to admit load items into each of said single load transporting compartments in turn as successive compartments are located in said input station, and with said discharge station located with one said group of load transporting compartments opening into said carton loading station, and
    (d) transfer means mounted for movement between the discharge station and carton loading station and operable to transfer load items from the group of load transporting compartments located in said discharge station into said loading station to load a carton located therein in use.

* * * * *